United States Patent [19]

Muramatsu

[11] 4,229,772
[45] Oct. 21, 1980

[54] TAPE RECORDER HAVING AN AUTOMATIC MODE SWITCHING MECHANISM

[75] Inventor: Hiroshi Muramatsu, Yokohama, Japan

[73] Assignee: Victor Company of Japan, Limited, Yokohama, Japan

[21] Appl. No.: 17,601

[22] Filed: Mar. 5, 1979

[30] Foreign Application Priority Data

Mar. 6, 1978 [JP] Japan ............................ 53/28235[U]

[51] Int. Cl.² ..................... G11B 15/02; G11B 15/18; G11B 15/44

[52] U.S. Cl. ........................... 360/69; 360/62; 360/72.2; 360/74.2; 360/137

[58] Field of Search ............ 360/69, 137, 61-62, 360/74.1, 73, 71, 90, 74.4, 72.1-72.2; 242/186-190, 208-210

[56] References Cited

U.S. PATENT DOCUMENTS

| | | | |
|---|---|---|---|
| 3,458,158 | 7/1969 | Ohira | 242/198 |
| 3,864,738 | 2/1975 | Syohji | 360/69 |
| 3,921,215 | 11/1975 | Asami | 360/137 |
| 3,947,894 | 3/1976 | Chimura | 360/137 |
| 4,003,087 | 1/1977 | Iwasaki et al. | 360/137 |
| 4,018,404 | 4/1977 | Sami | 360/137 |
| 4,081,849 | 3/1978 | Onishi et al. | 360/137 |

*Primary Examiner*—Alfred H. Eddleman
*Attorney, Agent, or Firm*—Lowe, King, Price & Becker

[57] ABSTRACT

A tape recorder comprising first and second latch bars respectively having predetermined tape operating functions and a crosspiece member disposed across the latch bars to lock one or both of the latch bars selectively into notches formed in the crosspiece member. These notches have different depths of cut in the lengthwise direction of the crosspiece member. A first and a second abutment member are movably mounted on the crosspiece to cause it to move in response to the detection of a recorded index signal in its lengthwise direction over different strokes depending on the position of the first abutment member relative to the second abutment member. The strokes are so determined that one of the latch bars is unlocked in response to the detection of a first index signal and the other latch bar is unlocked in response to the detection of a subsequent index signal.

3 Claims, 4 Drawing Figures

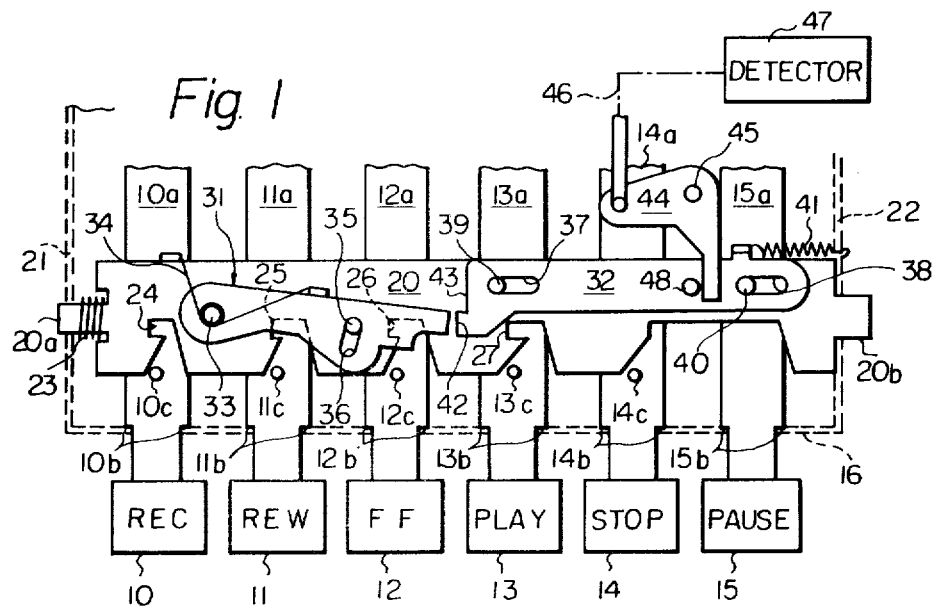
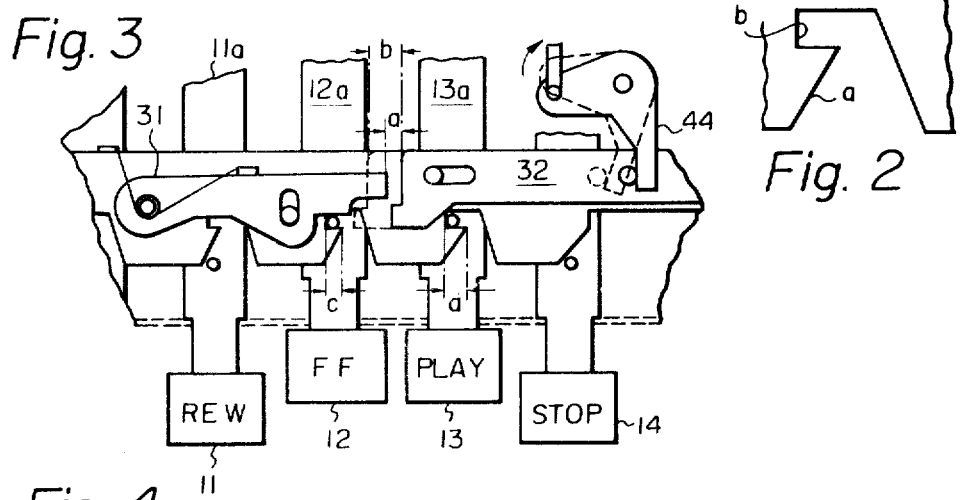
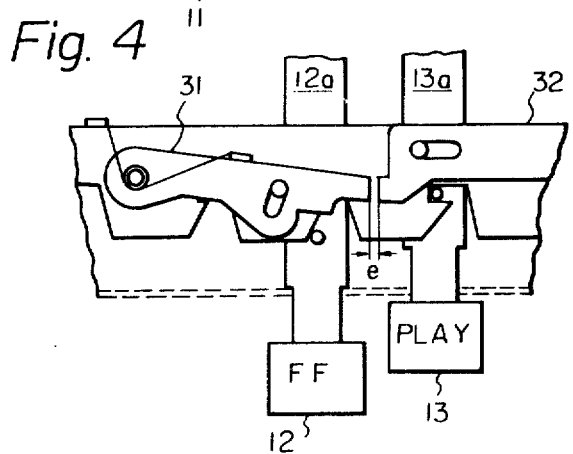

TAPE RECORDER HAVING AN AUTOMATIC MODE SWITCHING MECHANISM

FIELD OF THE INVENTION

The present invention relates to a tape recorder having an automatic mode switching device which automatically switches the operational mode of the tape recorder in response to a detected index signal recorded on the tape.

BACKGROUND OF THE INVENTION

Cueing and reviewing devices have been developed for tape recorders to allow the operator to search for a desired portion of the tape by manually holding the fast-forward key in its operative position while the playback key is being mechanically locked in its operative position, or by manually holding the rewind key while the recording key is mechanically locked in its operative position.

The automatic mode switching device for tape recorders is designed to supplant the operational features of the tape recorder by searching for an index signal recorded immediately ahead of the desired material such as music program while the tape is fed at a high speed. Responsive to detection of the index signal, the tape recorder is automatically switched to the playback mode to reproduce the recorded music. Some of the devices are also capable of automatically switching from a rewind mode which is effected after recording operation to the playback mode upon detection of the index signal. However, the mode switching devices of the prior art are unsatisfactory in terms of economy.

SUMMARY OF THE INVENTION

The tape recorder of the invention comprises a first latch bar having a pin thereon and responsive to a manual operation to move from a normal to an operative position to operate the tape recorder in a high tape transport mode and a second latch bar having a pin thereon and responsive to the manual operation to move from a normal to an operative position to operate the tape recorder in a low tape transport mode. A crosspiece member is disposed so as to be movable transverse to the length of the latch bars and formed with a first and a second notch at the intersections with the first and second latch bars, respectively, for engagement with the pins of the intersecting latch bars. The first notch has a greater depth of cut in the lengthwise direction of the crosspiece member than the depth of cut of the second notch in the same direction. The crosspiece member is caused to move in the lenghtwise direction in response to an output signal from the index detector over a distance greater than the depth of cut of the second notch but smaller than the depth of cut of the first notch to permit the pin of the second latch bar to disengage from the second notch, while the pin of the first latch bar remains engaged with the first notch. Responsive to the detection of a subsequent index signal, the crosspiece member is caused move over a distance which is greater than the depth of cut of the first notch to thereby permit the pin of the first latch bar to disengage from the first notch.

This differential movement of the crosspiece member is effected by two abutment members movably mounted on the crosspiece member. The first member is movable from a first to a second position in response to the movement of the second latch bar to its operative position for high tape speed operation and the second abutment member is engageable with the first abutment member in one of its first and second positions in response to the output signal from the index detector. With the first abutment member being in its first position, the two abutment members are spaced a first distance which is smaller than a second distance with which they are spaced when the first abutment member is in its second position. The second abutment member is movable in response to the output signal from the index detector over a third distance which is greater than the first or second distance. The crosspiece is caused to move a distance which is the difference between the second and third distances when the first abutment member is in its second position in response to a first output signal from the index detector and in response to a second output signal from the detector the crosspiece is then moved a distance which is the difference between the first and third distances. The difference between the second and third distances is set at a value greater than the depth of cut of the second notch but smaller than the depth of cut of the first notch, whereas the difference between the first and third distances is set at a value greater than the depth of cut of the first notch.

An object of the invention is therefore to provide a tape recorder having an index searching device and an automatic mode switching mechanism which is simple in construction and easy to manufacture and which can be easily incorporated with the conventional tape recorder.

BRIEF DESCRIPTION OF THE DRAWINGS

The invention will be further described by way of example with reference to the accompanying drawings in which:

FIG. 1 is a plan view of the automatic mode switching mechanism which also forms part of a tape recorder;

FIG. 2 is an enlarged view of a portion of the crosspiece member illustrating a notch;

FIG. 3 is a view illustrating the mechanism in a search mode; and

FIG. 4 is a view illustrating the mechanism in a playback mode.

DETAILED DESCRIPTION

FIG. 1 illustrates the automatic mode switching mechanism of the invention shown incorporated within a part of a tape recorder. Functional key knobs 10 to 15 respectively designated recording (REC), rewind (REW), fast-forward (FF), playback (PLAY) and pause (PAUSE) are each connected with latch bars indicated by subscript "a" which are disposed parallel to each other and formed with recesses indicated by subscript "b" at opposite edges adjacent to the key knobs. The latch bars 10a to 15a are urged with respective springs (not shown) against the front wall 16 of the apparatus housing so that they are normally held in the forward positions as indicated in FIG. 1. To each of the latch bars 10 to 14 is secured a pin "c".

A crosspiece member 20 is mounted movably in its lengthwise direction at opposite ends 20a and 20b on the side walls 21 and 22 and normally urged against the wall 22 by means of a spring 23. The crosspiece 20 has cut-outs 24, 25, 26 and 27 formed in positions at the points of intersection with corresponding latch bars 10, 11, 12 and 13, respectively. Each of these cut-outs has an edge "a" and a notch "b", as clearly shown in FIG. 2. The edge "a" extends at an angle to the length of the associated latch bar and the notch "b" is so formed as to have a predetermined depth of cut from the edge "a" in the lengthwise direction of the crosspiece 20. The cut-outs 24 to 26 have an identical configuration, while the notch 27b has a greater depth of cut than any one of the notches 24b, 25b and 26b.

Responsive to operation of one of the keys 10, 11, 12 and 13 from the normal position, the associated pin "c" engages the edge "a" of the corresponding cut-out of the crosspiece 20 to move it to the left from its normal position against the spring 23 until the pin falls into the corresponding notch, thereby holding the latch bar and the crosspiece in their operative positions.

Because of the greater depth of cut of notch 27b of the playback latch bar 13a, the latter is held in its operative position when the fast-forward or rewind key is operated in succession to the playback key, as illustrated in FIG. 3.

On the crosspiece 20 are mounted a first abutment member 31 and a second abutment member 32. The first abutment member 31 is pivoted on a pin 33 and normally urged in the clockwise direction by a spring 34 against a pin 35 which projects from the crosspiece 20 into a slot 36 formed in the member 31. The first abutment member 31 is so positioned as to engage the pin 12c of the fast-forward latch bar 12a when the latter is moved to its operated position so that the member 31 is rotated counterclockwise from its normal position to an operated position as indicated in FIG. 3. The second abutment member 32 has slots 37 and 38 into which extend pins 39 and 40 respectively from the crosspiece 20, the member 32 being normally biased by a spring 41 to a position in which the pins 39 and 40 engage the inner walls of the slots 37 and 38, respectively. The second abutment member 32 is recessed at the leftward end thereof to define stepped edges 42 and 43 in positions corresponding to the free end of the first abutment member 31 in its normal and operative positions, respectively.

A bell crank 44 is pivoted on a pin 45 mounted on the chassis of the apparatus and has its one end operatively connected by a linkage 46 to an index detector 47 of conventional design and the other end positioned to engage a pin 48 secured to the member 32. The index detector is designed to detect an index signal recorded in a position immediately ahead of each recorded material and rotates the bell crank 44 clockwise to move the crosspiece 20 to the left.

The operation of the embodiment of the invention will be best described with reference to FIGS. 3 and 4. When the apparatus is in a fast-forward mode with the keys 12 and 13 being in their operative positions as shown in FIG. 3 in which the detector 47 is allowed to search for the index signal, the first abutment member 31 is in its operative position in which its free end is spaced a distance "a" from the edge 43 of the second abutment member 32. In response to the index detector 47 detecting the desired index signal, the bell crank 44 is caused to rotate to a position indicated in broken lines to thereby move the second abutment member 32 over a distance "b" which is chosen at a value greater than the distance "a". Therefore, the first and second abutment members 31 and 32 are brought into abutment contact with each other, and the crosspiece 20 is then moved to the left by an amount equal to the difference between distances "a" and "b", which difference is chosen at a value greater than the depth of cut "c" of the notch 26b but smaller than the depth of cut "d" of the notch 27b. The pin 12c of the fast-forward latch bar is thus disengaged from the notch 26b, thus allowing it to return to the normal position as shown in FIG. 4 to operate the apparatus in a playback mode.

With the fast-forward key 12 being in the normal position, the first abutment member 31 is returned to its normal position in which its free end is spaced a distance "e" from the edge 42 of the second abutment member 32. Therefore, upon the detection of a subsequent index signal, the leftward movement of the second abutment member 32 over the distance "b" now causes the crosspiece 20 to move to the left by an amount equal to the difference between distances "b" and "e", which difference is greater than the depth of cut "d" of the notch 27b. Thus, the pin 13c is disengaged from the notch 27b to allow the playback latch bar 13a to return to its normal position, terminating the playback operation.

The embodiment described above can be adapted for use in a tape recorder which provides automatic mode switching from rewind to playback operations in response to an output signal from an automatic tape stopping device at the end of a tape, which was only available with the prior art tape recorder having a complex, costly mechanism.

What is claimed is:

1. A tape recorder having means for detecting an index signal recorded on a tape, and means for feeding said tape at high and low selectable speeds, comprising:

first and second latch bars each having a pin and longitudinally movable respectively in response to a manually applied pressure from a normal position to an operative position to cause said tape to feed at said low and high speeds respectively;

a crosspiece member intersecting said first and second latch bars and movable in the lengthwise direction thereof and having first and second notches in positions to engage the pins of said first and second latch bars respectively, the first notch having a greater depth of cut in the lengthwise direction of said crosspiece member than that of said second notch, whereby the pins of said first and second latch bars engage respectively the first and second notches of said crosspiece member in response to said manually applied pressure;

a first abutment member on said crosspiece member and movable from a normal position to an operative position in response to the movement of said second latch bar to its operative position; and a second abutment member on said crosspiece member and movable in the lengthwise direction of said crosspiece member in response to an output signal from said index detecting means to engage said first abutment member in its operative position to cause said crosspiece member to move a distance which is greater than the depth of cut of said second notch and smaller than the depth of cut of said first notch to disengage the pin of the second latch bar from said second notch to thereby cause said second latch bar to return to its normal position causing said first abutment member to return to its normal position and movable in response to a subsequent output signal from said index detecting means to engage said first abutment member in its normal position to cause said crosspiece member to move a distance which is greater than the depth of cut of said first notch to disengage the pin of the first latch bar from said first notch.

2. A tape recorder as claimed in claim 1, wherein said first abutment member is pivoted at one end on said crosspiece member to rotate from a first to a second position in response to the movement of said second latch bar and wherein said second abutment member is formed with a first abutment end engageable with the free end of said first abutment in its normal position and a second abutment end engageable with the free end of said first abutment member in its operative position.

3. A tape recorder as claimed in claim 2, wherein said first abutment end of said second member is spaced from the free end of said first abutment member in its normal position a distance which is smaller than a distance with which said second abutment end of said second member is spaced from the free end of said first abutment member in its operative position.

* * * * *